(12) United States Patent
Albrecht et al.

(10) Patent No.: US 7,495,580 B2
(45) Date of Patent: Feb. 24, 2009

(54) ARRANGEMENT FOR LOCATING A PARKED VEHICLE

(75) Inventors: Stefan Albrecht, Mauchenheim (DE); Roland Fischer, Nidderau (DE); Peter Herges, Stuttgart (DE); Joerg Huber, Durmersheim (DE); Roland Roessler, Leonberg (DE); David J. Skiff, Rochester, MI (US); John A. Wilke, Oxford, MI (US)

(73) Assignee: Daimler AG, Stuggart (DE)

( * ) Notice: Subject to any disclaimer, the term of this patent is extended or adjusted under 35 U.S.C. 154(b) by 202 days.

(21) Appl. No.: 11/440,027

(22) Filed: May 25, 2006

(65) Prior Publication Data

US 2007/0273553 A1    Nov. 29, 2007

(51) Int. Cl.
*B60Q 1/48* (2006.01)
*G08G 1/14* (2006.01)
*G01G 13/08* (2006.01)
*G01S 5/00* (2006.01)
*H04B 7/185* (2006.01)
*G01S 4/02* (2006.01)

(52) U.S. Cl. ............... 340/932.2; 342/123; 342/357.07; 342/462

(58) Field of Classification Search ............... 340/932.2, 340/996, 988, 989, 539.32, 426.11–426.28; 342/357.07, 357.11, 123, 457, 462; 181/124, 181/125
See application file for complete search history.

(56) References Cited

U.S. PATENT DOCUMENTS 6,590,534 B1 * 7/2003 Kroll et al. .................. 342/442
6,696,927 B2 * 2/2004 Flick ......................... 340/426.1
6,864,800 B2 * 3/2005 Leichtfried et al. ..... 340/825.72
7,057,520 B1   6/2006 Bartz et al.

FOREIGN PATENT DOCUMENTS

| DE | 3439644 A1     | 4/1986  |
| DE | 198 20 921 A1  | 11/1999 |
| DE | 198 50 176 C1  | 8/2000  |
| DE | 10111552 A1    | 9/2002  |
| DE | 102004023939 A1| 12/2005 |
| JP | 2002106217 A * | 4/2002  |

OTHER PUBLICATIONS

PCT International Search Report dated Jul. 11, 2007 with English translation of relevant portion (eleven (11) pages).

* cited by examiner

*Primary Examiner*—Benjamin C Lee
*Assistant Examiner*—Jennifer Mehmood
(74) *Attorney, Agent, or Firm*—Crowell & Moring LLP

(57) ABSTRACT

The invention relates to an apparatus for finding a parked vehicle again. According to the invention, a portable unit is provided with a pressure sensor whose signals can be evaluated by an evaluation and control unit in order to determine the current air pressure, with the evaluation and control unit evaluating the determined air pressure in order to determine altitude, and storing a first air pressure value as a reference value at a predeterminable first time, which reference value represents an instantaneous altitude of a geographic position of the parked vehicle, with the evaluation and control unit estimating a height difference between a current geographic position of the portable unit and the geographic position of the parked vehicle at a second time, and/or continuously from a pressure difference between the determined current air pressure value and the reference value.

13 Claims, 1 Drawing Sheet

ARRANGEMENT FOR LOCATING A PARKED VEHICLE

BACKGROUND AND SUMMARY OF THE INVENTION

Figure 1:
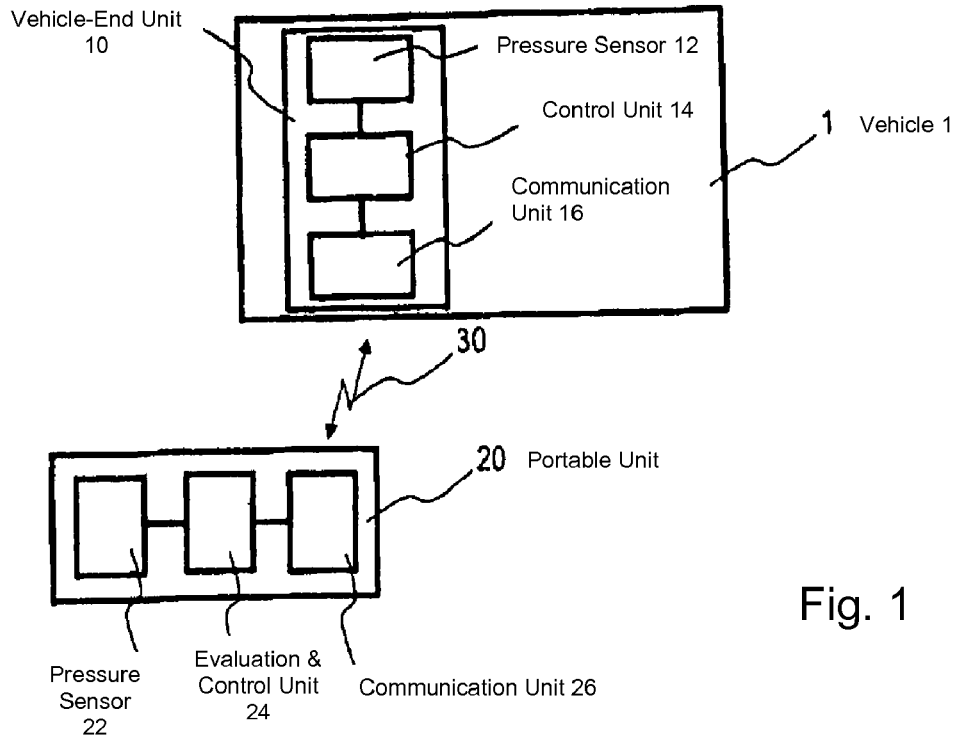

The invention relates to an apparatus for finding a parked vehicle again, as claimed in the preamble of patent claim 1.

The subject matter of the invention application is the relatively daily problem which occurs when someone has parked a vehicle in a large multistory car park and cannot find it again after visiting a supermarket, a cinema, after work or after traveling. A similar search can arise with car rental companies, company transport pools and large car workshops with a multistory car park.

Laid-open specification DE 10 2004 023 939 A1 describes a key for locking a lock, by means of which the lock can be found again after a relatively long time. The described key has a device for storage of the position of the lock, as well as an output apparatus for outputting the position. The position data is preferably determined using a global positioning system (GPS). A communication link with a satellite system must be ensured for this purpose.

DE 10111552 A1 discloses a mobile transponder which contains a GPS receiver by means of which this determines the position at which the transponder is located. Direction information is determined from the comparison of this position with the position of the vehicle, and is indicated.

DE 198 20 921 A1 discloses a mobile transponder for vehicles which receive a signal originating from the vehicle and use this to identify direction information about the location of the vehicle with respect to the mobile transponder. This direction information is indicated on a display in the mobile transponder.

Laid-open specification DE 34 39 644 A1 describes an altimeter for motor vehicles. The described altimeter has an air-pressure measurement device which supplies a corresponding electrical measured value, with this measured value being linked in an evaluation circuit with a reference variable that is stored in a memory, and with a drive signal, which corresponds to the current altitude value, being derived from this for a display unit. An altitude value that has been entered via a keyboard or the current altitude value most recently displayed on the display unit can be written as a reference variable to the memory, so that greater measurement accuracy can be achieved by repeated adjustment.

The object of the invention is to specify an apparatus for finding a parked vehicle again, which in particular makes it possible to find a floor level in a multistory car park or in an underground garage in which the vehicle is parked.

The invention achieves this object by the provision of an apparatus for finding a parked vehicle again, having the features of patent claim 1.

Advantageous embodiments and developments of the invention are specified in the dependent claims.

According to the invention, an apparatus for finding a parked vehicle again comprises a portable unit with a pressure sensor whose signals can be evaluated by an evaluation and control unit in order to determine the current air pressure, with the evaluation and control unit evaluating the determined air pressure in order to determine altitude, and storing a first air pressure value as a reference value at a predeterminable first time which reference value represents an instantaneous altitude of a geographic position of the parked vehicle. The evaluation and control unit estimates a height difference between a current geographic position of the portable unit and the geographic position of the parked vehicle at a second time, and/or continuously from a pressure difference between the determined current air pressure value and the reference value. The apparatus according to the invention advantageously makes it possible to determine the floor level in a multistory car park and/or in an underground garage in which the vehicle being looked for is parked. Furthermore, the apparatus according to the invention can be implemented at low cost and in a physically small manner by the use of appropriate pressure sensors.

In a refinement of the apparatus according to the invention for finding a parked vehicle again, a vehicle-end unit is provided with a pressure sensor whose signals can be evaluated by a vehicle-end evaluation and control unit in order to determine the current air pressure. The vehicle-end evaluation and control unit evaluates the determined air pressure in order to determine the altitude, and stores a first air pressure value as a reference value, relating to the predeterminable first time, which reference value represents the instantaneous altitude of the geographical position of the parked vehicle. A communication path is advantageously set up between a portable unit in the vehicle in order to interchange information between a communication unit and the portable unit and a vehicle-end communication unit.

In a further refinement of the apparatus according to the invention for finding a parked vehicle again, the portable unit and the vehicle-end unit are matched to one another via the communication path at the first time such that the same first air pressure value is stored as the reference value at the first time in the evaluation and control unit in the portable unit and in the vehicle-end evaluation and control unit. The evaluation and control unit in the portable unit receives the reference value, which is stored in the vehicle-end evaluation and control unit, at the second time via the communication path to determine the altitude difference. The vehicle-end evaluation and control unit can update the first air pressure value stored as the stored reference value as required and/or continuously by renewed evaluation of the signals from the vehicle-end pressure sensor. This makes it possible to compensate in an advantageous manner for weather-dependent air pressure fluctuations in the altitude determination.

In a further refinement of the apparatus according to the invention, the evaluation and control unit in the portable unit determines a floor-level difference in a multistory car park from the altitude difference determined at the second time, and emits the determined altitude difference. The evaluation and control unit in the portable unit uses, for example, an average value for the altitude of a multistory car park floor level to convert the determined altitude difference to the floor level difference. By way of example, the portable unit is in the form of an electronic vehicle key. The first time may, for example, be defined by a locking process of the parked vehicle. The second time may, for example, be defined by a control action which can be carried out via the portable unit. The control action comprises, for example, a predeterminable number of operations or one operation for a predeterminable time period of at least one control element which is arranged on the portable unit. In order to ensure that the vehicle can be found only by the person with the key, the communication path can, for example, allow only coded information transmission between the vehicle-end unit and the associated portable unit.

In a further refinement of the apparatus according to the invention, the vehicle-end unit and/or the portable unit have/has means for temperature compensation. This advantageously makes it possible to avoid temperature influences affecting the measurement of the air pressure.

In order to determine the precise vehicle position on the correct floor level once that floor level has been found, the apparatus according to the invention can be combined with means which allow two-dimensional location of the vehicle in a large parking lot or on one floor level of a multistory car park or an underground garage.

There are now various possible ways to refine and to develop the teaching of the present invention in an advantageous manner. For this purpose, reference is made on the one hand to the dependent claims and on the other hand to the following explanation of embodiments. The advantageous refinements which result from any desired combination of the dependent claims should also be included.

BRIEF DESCRIPTION OF THE DRAWING FIGURES

Figure 2:
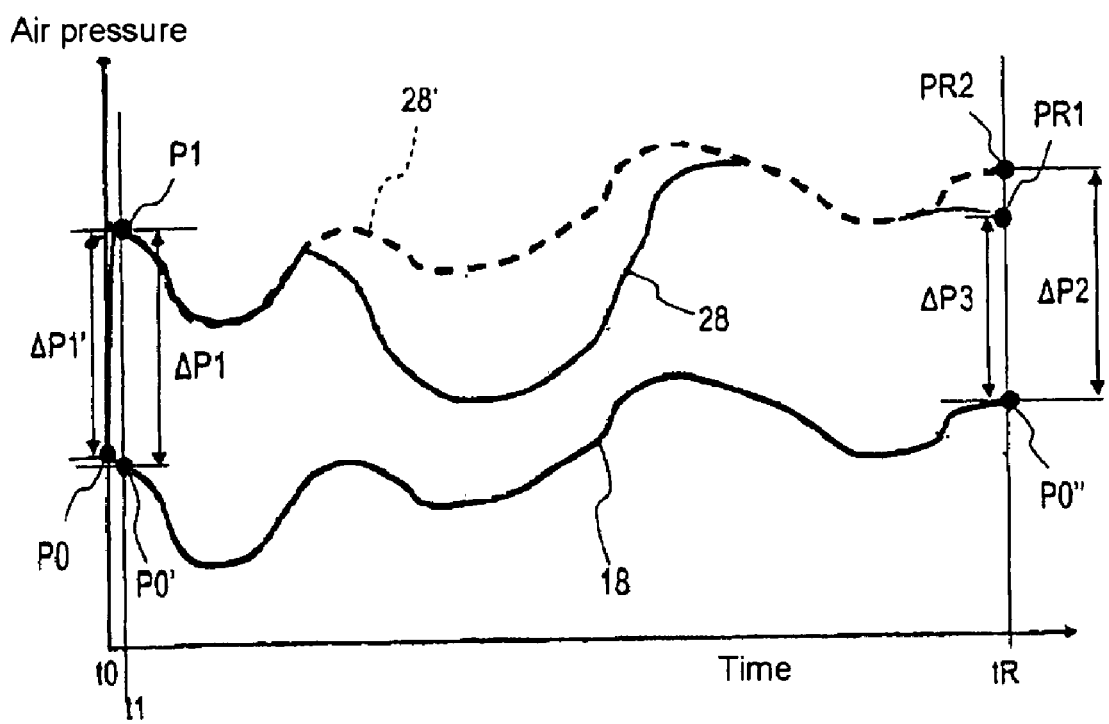

Advantageous embodiments of the invention will be described in the following text and are illustrated in the drawings, in which:

FIG. 1 shows a schematic block diagram of an apparatus according to the invention for finding a parked vehicle again, and FIG. 2 shows a graph illustrating measurement curves for different pressure sensors in the apparatus shown in FIG. 1.

DETAILED DESCRIPTION

As can be seen from FIG. 1, one exemplary embodiment of the apparatus according to the invention for finding a parked vehicle 1 again comprises a portable unit 20, which has a pressure sensor 22, an evaluation and control unit 24 and a communication unit 26, and a vehicle-end unit 10, which likewise has a pressure sensor 12, an evaluation and control unit 14 and a communication unit 16. A communication path 30 can be set up between the communication unit 26 in the portable unit 20 and the vehicle-end communication unit 16, in order to interchange information. The pressure sensors 12, 22 are, for example, produced on a semiconductor basis and have very small dimensions, so that one of the pressure sensors 22 can be integrated without any problems in the portable unit 20 which, for example, is in the form of an electronic vehicle key.

The following text describes possible methods of operation of the apparatus according to the invention for finding a parked vehicle 1 again, with reference to FIGS. 1 and 2.

The evaluation and control unit 24 in the portable unit 20 evaluates signals from the pressure sensor 22 in order to determine the current air pressure. Furthermore, the evaluation and control unit 24 evaluates the determined air pressure in order to determine the altitude of a current geographical position of the portable unit 20. The vehicle-end evaluation and control unit 14 analogously evaluates signals from the vehicle-end pressure sensor 12 in order to determine the current air pressure, with the vehicle-end evaluation and control unit 14 likewise evaluating the determined air pressure in order to determine the altitude of the geographical position of the vehicle 1.

The measurement of the air pressure makes it possible to determine the altitude or depth with respect to a reference level with a relative accuracy of better than one meter. This makes it possible to distinguish easily between the individual floor levels in a multistory car park, whose height is about 4 m. Since the determined air pressure changes, however, not only as a result of the altitude with respect to a reference level but also as a result of weather-dependent air-pressure fluctuations, the two pressure sensors 12, 22 are used in the illustrated exemplary embodiment, of which a first pressure sensor 12 is arranged in the vehicle 1 and a second pressure sensor 22 is arranged in the portable unit 20. The two pressure sensors 12, 22 experience the weather-dependent air-pressure fluctuations in the same way. These air-pressure fluctuations may occur within a relatively long time period, for example over the course of days, or else within shorter time periods, for example within hours, in the case of a sudden weather change, for example in the case of the Bavarian Föhn.

When the parked vehicle is locked in the multistory car park at a first time t0, the air pressure values measured by the two pressure sensors 12, 22 are matched with one another via the communication path 30, and are stored in the vehicle-end evaluation and control unit 14 and in the evaluation and control unit 22 in the portable unit, as a reference value P0. The values determined by the pressure sensors 12, 22 for a current air pressure are matched to one another such that the same first air pressure value is stored as the reference value P0 at the first time t0 in the evaluation and control unit 24 in the portable unit 20 and in the vehicle-end evaluation and control unit 14.

The air pressure value which is stored as the reference value P0 can then be used as the initial value for the further measurements. By way of example, an altitude value for the current geographical vehicle position, which is represented by the reference value P0, can thus be set to be equal to zero for the subsequent altitude difference determination processes. A measurement curve 18 which is illustrated in FIG. 2 corresponds to an air pressure profile which is measured by the vehicle-end pressure sensor 12. The fluctuations which can be seen from the measurement curve 18 are based only on the weather-dependent air pressure fluctuations, since the geographical position of the parked vehicle 1 does not change during the observation time period.

As can also be seen from FIG. 2, a measurement curve 28 shows an air pressure profile which is measured by the pressure sensor 22 in the portable unit 20 during the observation time period. The air pressure measured in the portable unit 20 includes all of the weather-dependent and altitude-dependent air pressure fluctuations. A measurement curve 28', which is represented by a dashed line, shows the profile of the air pressure which would be measured in the portable unit 20 if the portable unit 20 were to move on only one level during the observation time period, and, for example, which corresponds to the altitude at which the multistory car park was left at the time t1. This level is represented by an air pressure value P1 measured by the pressure sensor 22 at the time t1. In order to determine the number of floor levels which are located between the instantaneous floor level and that floor level on which the vehicle 1 is parked, a pressure difference is determined between the stored reference value P0 and the currently measured air pressure P1. In order to estimate the pressure difference, it is sufficient for the evaluation and control unit 24 in the portable unit 20 to determine and to evaluate the pressure difference $\Delta P1'$ between the reference value P0 stored at the time t0 and the air pressure P1 determined currently at the time t1. In order to accurately determine the pressure difference, with this process also taking account of weather-dependent fluctuations in the air pressure, the evaluation and control unit 24 in the portable unit 20 requests a currently measured air pressure value from the vehicle-end unit 10 via the communication path 30, as an updated reference value P0'. For this purpose, the vehicle-end evaluation and control unit 14 determines current air pressure values as required and/or continuously, and stores each of them as an updated reference value P0', P0''. This advantageously allows compensation for the weather-dependent air pressure fluctuations which occur in the same way at the vehicle 1 and at the portable unit 20, with the pressure difference ΔP1 between the current air pressure P0' at the vehicle 1 and the current air pressure P1 at the portable unit 20 being determined accurately at the time t1.

If the multistory car park is once again entered at the time tR and at the same level from which it was left, then a good map of the altitude difference can be determined via the pressure difference ΔP2 determined at the time tR between the air pressure PR2 measured by the portable unit 20 and the updated reference value P0" stored in the vehicle-end evaluation and control unit 24, and this can be converted to the number of floor levels which are located between the current floor level and the destination floor level on which the vehicle is parked. If the multistory car park is entered on a different floor level and the search function is initiated after entering the multistory car park on a different floor level, then, at the time tR, there is a pressure difference ΔP3 between the current air pressure value PR1 determined in the portable unit and the updated reference value P0" stored in the vehicle-end evaluation and control unit 24. Analogously to the statements relating to the time t1, the portable unit 20 communicates via the communication path 30 at the time tR with the vehicle-end unit 10 in order to be able to determine the current air pressure difference ΔP2 or ΔP3 for the floor level search. This means that, when a control action is initiated by a user, the portable unit 20 requests the reference value P0" measured by the vehicle-end unit. The vehicle-end unit 10 then transmits the instantaneous air pressure value as the current reference value P0" via the communication path 30 to the portable unit 20, for evaluation.

For the majority of the electromagnetic frequency spectrum that is normally used for purposes such as these, communication between the portable unit 20 and the vehicle-end unit 10 does not represent a problem in a multistory car park. In the situation in which the portable unit 20 receives an excessively weak signal or no signal from the vehicle-end unit 10, the portable unit 20 can determine the destination floor level by estimating the altitude difference using the reference value P0 stored in the evaluation and control unit 24 in the portable unit 20 at the time t0. In order to compensate for the temperature influence in the determination of the air pressure value, very accurate temperature compensation is carried out in the portable unit 20 and in the vehicle-end unit 10 since in general, despite the pressure sensors 12, 22 in the vehicle 1 and in the portable unit 20 being of the same type, the two pressure sensors 12, 22 may be at different temperatures.

In order to ensure that the vehicle 1 can be found only by the person with the key, the communication path 30 can, for example, allow only coded information transmission between the vehicle-end unit 10 and the associated portable unit 20. Furthermore, the communication path 30 which can be set up allows optical or acoustic feedback to be initiated from the vehicle 1, when specific preconditions are satisfied. In order to avoid endangering the searcher, acoustic feedback which, for example, may be emitted by the horn, or optical feedback which, for example, may be emitted via headlights, turn indicators etc., is activated, for example, only within a definable distance from the parked vehicle 1, which can be determined by the signal range of the communication path 30, or by pushing a control element on the portable unit 20 twice or for a relatively long time.

Furthermore, the apparatus according to the invention for finding a parked vehicle again can be combined without any problems with further methods from the initially cited prior art, such as direction-finding methods and/or position data determination via GPS.

The invention claimed is:

1. An apparatus for finding a parked vehicle, comprising:
   a portable unit with a pressure sensor that produces signals for evaluation by an evaluation and control unit in order to determine a current air pressure as a determined air pressure, with the evaluation and control unit evaluating the determined air pressure in order to determine altitude, and storing a first air pressure value as a reference value at a predeterminable first time, which reference value represents an instantaneous altitude of a geographic position of the parked vehicle, with the evaluation and control unit estimating a height difference between a current geographic position of the portable unit and the geographic position of the parked vehicle at a second time, or continuously from a pressure difference between the determined current air pressure value and the reference value,
   wherein, at the second time,
      when the portable unit communicates with a vehicle-end unit, the portable unit uses a pressure value obtained from the vehicle-end unit at the second time to estimate the height difference, and
      when the portable unit cannot communicate with the vehicle-end unit, the portable unit uses the reference value to estimate the height difference.

2. The apparatus as claimed in claim 1,
   wherein the vehicle-end unit includes a pressure sensor that produces signals for evaluation by a vehicle-end evaluation and control unit in order to determine the current air pressure, with the vehicle-end evaluation and control unit evaluating the determined air pressure in order to determine the altitude, and storing a first air pressure value as a reference value at a predeterminable first time, which reference value represents the instantaneous altitude of the geographic position of the parked vehicle.

3. The apparatus as claimed in claim 2, comprising:
   a communication path which is set up for interchanging information between a communication unit in the portable unit and a vehicle-end communication unit.

4. The apparatus as claimed in claim 3, wherein
   the portable unit and the vehicle-end unit are matched to one another via the communication path at the predeterminable first time, such that the same first air pressure value is stored as the reference value at the first time in the evaluation and control unit in the portable unit and in the vehicle-end evaluation and control unit.

5. The apparatus as claimed in claim 3, wherein
   the evaluation and control unit in the portable unit receives the reference value which is stored in the vehicle-end evaluation and control unit, at the second time via the communication path to determine the altitude difference.

6. The apparatus as claimed in claim 2, wherein
   the vehicle-end evaluation and control unit updates the reference value as required or continuously by renewed evaluation of the signals from the vehicle-end pressure sensor.

7. The apparatus as claimed in claim 1, wherein the evaluation and control unit in the portable unit determines a floor-level difference in a multistory car park from the altitude difference determined at the second time.

8. The apparatus as claimed in claim 7, wherein the evaluation and control unit in the portable unit converts the determined altitude difference to the floor-level difference using an average value for the altitude of a floor level in a multistory car park.

9. The apparatus as claimed in claim 1, wherein the portable unit is an electronic vehicle key.

10. The apparatus as claimed in claim 1, wherein the vehicle-end unit or the portable unit compensate for temperature.

11. The apparatus as claimed in claim 3, wherein the communication path allows only coded information transmission between the vehicle-end unit and an associated portable unit.

12. The apparatus as claimed in claim 1, wherein the predeterminable first time is defined by a locking process of the parked vehicle.

13. The apparatus as claimed in claim 1, wherein the second time is defined by a control action which is carried out via the portable unit.

* * * * *